US009824229B2

(12) United States Patent
Okamura et al.

(10) Patent No.: US 9,824,229 B2
(45) Date of Patent: Nov. 21, 2017

(54) CONTROLLER WITH ENHANCED RELIABILITY

(71) Applicant: OMRON CORPORATION, Kyoto (JP)

(72) Inventors: Kotaro Okamura, Shiga (JP); Yoshihide Nishiyama, Kanagawa (JP); Masanori Ota, Shiga (JP); Koji Yaoita, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 32 days.

(21) Appl. No.: 14/078,710

(22) Filed: Nov. 13, 2013

(65) Prior Publication Data
US 2014/0136570 A1 May 15, 2014

(30) Foreign Application Priority Data
Nov. 14, 2012 (JP) .................................. 2012-250658

(51) Int. Cl.
*G06F 7/00* (2006.01)
*G06F 17/30* (2006.01)
(Continued)

(52) U.S. Cl.
CPC ....... *G06F 21/6218* (2013.01); *G05B 19/056* (2013.01); *G06F 11/3055* (2013.01);
(Continued)

(58) Field of Classification Search
None
See application file for complete search history.

(56) References Cited

U.S. PATENT DOCUMENTS 5,325,528 A * 6/1994 Klein ...................... H04L 29/06
714/E11.133
6,154,846 A * 11/2000 Arai ............................. 713/323
(Continued)

FOREIGN PATENT DOCUMENTS

CN 102456052 5/2012
JP 2004-157997 6/2004
(Continued)

OTHER PUBLICATIONS

Office Action in Japanese Application No. 2012-250658, dated Jul. 19, 2016, with English language translation.
(Continued)

*Primary Examiner* — Uyen Le
(74) *Attorney, Agent, or Firm* — Greenblum & Bernstein, P.L.C.

(57) ABSTRACT

A controller with enhanced reliability of access to a database system. A programmable logic controller (PLC) accessible to a database accesses a database (DB) server in response to an event in which a user program calls a DB access processing program. The DB access processing program stores status information indicating a status of accesses to the DB server in a nonvolatile memory, in accordance with an instruction of the user program. When a power interruption occurs, the PLC can obtain a status of accesses to the DB server at the timing of the occurrence of the power interruption by referring to the status information. Then, the PLC, for example, re-sends a structured query language (SQL) sentence, depending on the access status.

12 Claims, 11 Drawing Sheets

(51) Int. Cl.
*G06F 21/62* (2013.01)
*G05B 19/05* (2006.01)
*G06F 11/30* (2006.01)

(52) U.S. Cl.
CPC .... *G06F 17/30368* (2013.01); *G06F 11/3024* (2013.01); *G06F 11/3041* (2013.01)

(56) References Cited

U.S. PATENT DOCUMENTS

| | | | |
|---|---|---|---|
| 6,859,834 B1 * | 2/2005 | Arora | G06F 9/5033 |
| | | | 709/225 |
| 2006/0212422 A1 * | 9/2006 | Khilani | G06F 9/45512 |
| 2009/0193025 A1 * | 7/2009 | Iwamoto | G06F 17/30545 |
| 2010/0007908 A1 * | 1/2010 | Homma | G03G 15/5012 |
| | | | 358/1.14 |
| 2010/0251244 A1 * | 9/2010 | Fukui | 718/100 |

FOREIGN PATENT DOCUMENTS

| | | |
|---|---|---|
| JP | 2006-338145 | 12/2006 |
| JP | 2012-108642 | 6/2012 |

OTHER PUBLICATIONS

Office Action in Chinese Application 201310566385.3 with English language translation, dated Feb. 4, 2017.
Office Action in Japanese Application 2012-250658 with English language translation, dated Feb. 17, 2017.

\* cited by examiner

FIG. 6

| ENUMERATED TYPE | ENUMERATOR | |
|---|---|---|
| eDBC_SEND_STATUS | _DBC_SEND_INIT | (INITIAL STATUS) |
| | _DBC_SEND_UNSENT | (UNSENT SQL SENTENCE) |
| | _DBC_SEND_SENDING | (SQL SENTENCE BEING SENDING) |
| | _DBC_SEND_SPOOLED | (SPOOLING OF SQL SENTENCE) |
| | _DBC_SEND_COMPLETE | (COMPLETION OF SENDING OF SQL SENTENCE) |

FIG. 9

| TIMING OF POWER INTERRUPTION | (1) START | (2) READ CURRENT VALUE | (3) SENDING | (3) SENDING Ack | (5-1) OCCURRENCE OF FAILURE (5-2) OCCURRENCE OF TIME-OUT OF INSTRUCTION | (6-1) COMPLETION | (6-1) COMPLETION (SPOOLING) |
|---|---|---|---|---|---|---|---|
| TIMING OF POWER INTERRUPTION State | DBC_SEND_UNSENT | | DBC_SEND_SENDING | | | DBC_SEND_COMPLETE | DBC_SEND_SPOOLED |
| MEASURES TAKEN BY USER | RE-SEND SQL SENTENCE BY EXECUTING USER PROGRAM | | CHECK PRESENCE OF RECORD IN DB, AND RE-SEND SQL SENTENCE BY EXECUTING USER PROGRAM | | | NO MEASURES REQUIRED | RE-SEND SPOOLED SQL SENTENCE |

*FIG. 10*

```
VAR   RETAIN
        MyMapVar : sMyMap ;
        MyState  : _eDBC_SEND_STATUS ;
END   VAR
```

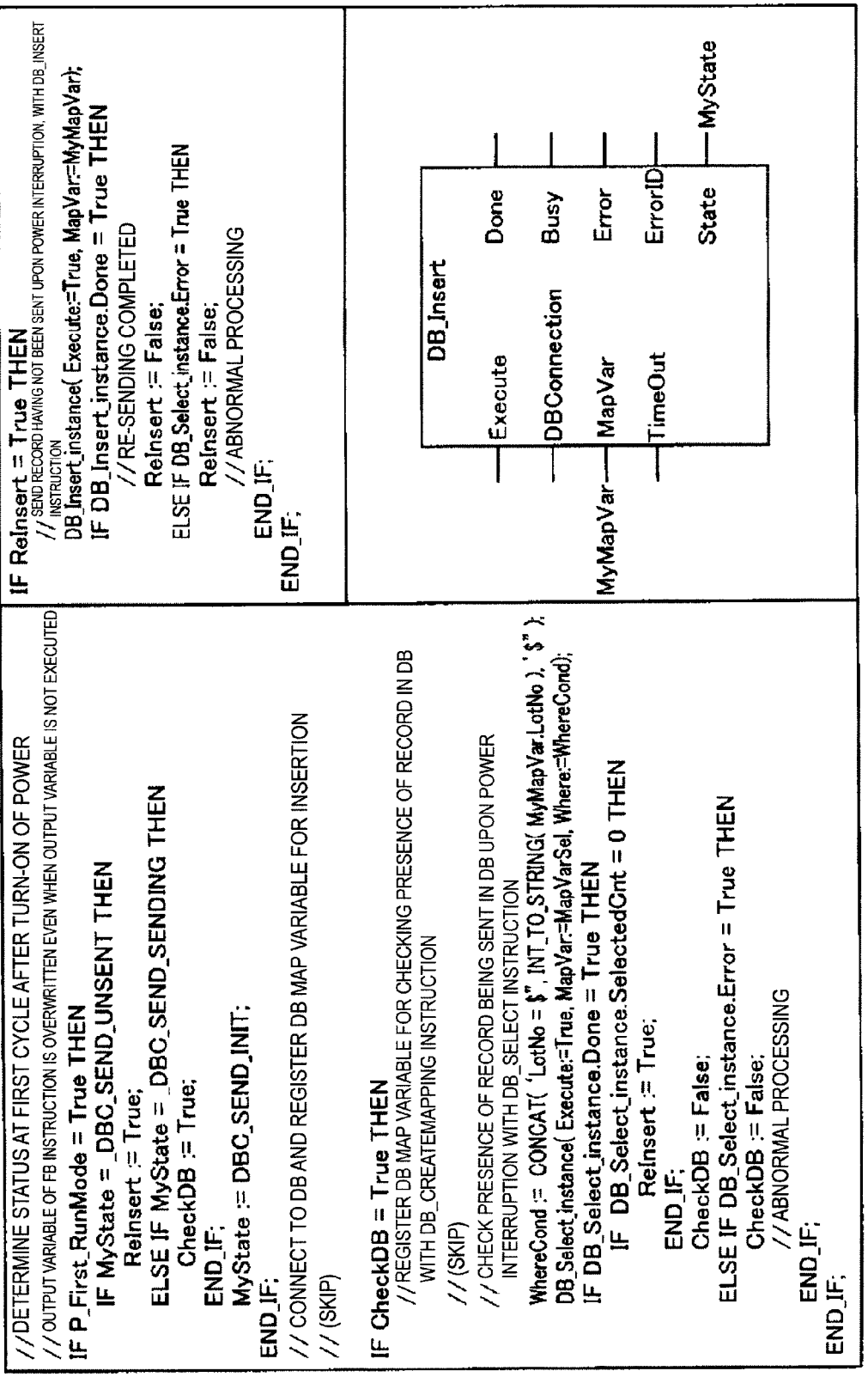

CONTROLLER WITH ENHANCED RELIABILITY

1. TECHNICAL FIELD

The present invention relates to a controller such as a programmable logic controller (PLC) and a program, and more particularly to a controller and program for sending data to a database system.

2. RELATED ART

Controllers such as PLCs have been used, for example, to control automated machines in factories and the like. A typical controller has a plurality of I/O functions to successively read values, for example, output from sensors, and hold the read values as data.

Recent PLCs are connectable to database systems, and can accumulate data held in the PLCs in database systems. Using PLCs of this type facilitates data sharing among information processing devices connected to database systems, thereby enabling various types of data to be easily, for example, collected, summarized, and analyzed. As one example of such PLCs, Japanese Unexamined Patent Publication No. 2012-108642 discloses a PLC that functions to send to a database a SQL process group that contains a plurality of SQL sentences for accessing the database.

If the power supplied to a controller such as a PLC becomes unstable for some reasons, the accesses to a database system may be interrupted. An exemplary controller typically holds data in a nonvolatile memory as spool information, and regularly saves this spool information in an external storage device. Even if the controller fails to save spool information in the external storage device due to a power interruption, it can save the unsaved spool information in the external storage device again after the power recovery. However, if the power interruption occurs while the controller is saving data in the external storage device, the existing saved data may be damaged. Thus, the occurrence of a power interruption may cause the loss of data that a controller would send to a database system, resulting in the lowering of the reliability of the controller.

SUMMARY

The present invention addresses the above disadvantage with an object of providing a technique for improving the reliability of access to a database system in a controller, such as a PLC.

A controller according to one embodiment of the present invention includes: an instruction executing unit configured to execute a user program for controlling a controlled object; a communication interface that connects with a database system; an access processing unit configured to generate an instruction sentence in accordance with an access instruction for accessing the database system, in response to execution of the user program containing the access instruction, and control an access to the database system on the basis of the generated instruction sentence; and a status output unit configured to generate status information indicating an execution status of the instruction sentence and output the generated status information, from when the access processing unit starts a process of accessing to the database system on the basis of the instruction sentence generated in accordance with the access instruction to when the access processing unit completes the process based on the instruction sentence.

It is preferable that the controller may further include a nonvolatile memory, and that the access processing unit may include an instruction output section that stores the instruction sentence in the memory until the process based on the instruction sentence is completed.

The status information preferably may contain information that indicates a sending status of a SQL sentence for accessing the database system.

The status information preferably may contain information that indicates whether to save the SQL sentence for accessing the database system, in a storage unit.

The controller preferably may further include a holding unit which holds a recovery program that refers to the status information and recovers the process of the access to the database system, depending on an access status indicated by the status information. The controller may execute the recovery program in a predetermined operating status.

The recovery program preferably may carry out the recovery, depending on the sending status of the SQL sentence that the controller sends to the database system.

In accordance with another embodiment of the present invention, there is provided a program for controlling an operation of a controller, the controller including a processor and a communication interface that connects with a database system, the program allowing the processor to perform the steps of: generating an instruction sentence in accordance with an access instruction for accessing the database system, in response to execution of a user program containing the access instruction, and controlling the access to the database system on the basis of the generated instruction sentence; and generating status information that indicates an execution status of the instruction sentence and outputting the generated status information, from when an access processing unit starts a process of accessing to the database system on the basis of the instruction sentence generated in accordance with the access instruction to when the access processing unit completes the process based on the instruction sentence.

According to the above embodiments, a controller holds an access status indicating accesses to a database system as status information, and enables the reference to this access status during a process of carrying out a recovery even in a case of a power interruption. It is consequently possible to improve the reliability of access to a database system.

The above and other objects, features, aspects, and advantages of the present invention will become apparent from the following detailed description of this invention that will be understood in conjunction with the accompanying drawings.

BRIEF DESCRIPTION OF THE DRAWINGS

FIG. 6 shows data held in status information;

FIG. 9 is a table showing the timing of a power interruption, an output variable State, and measures taken against power interruption.

FIG. 10 shows an exemplary user program for allowing the DB access processing program to output the status information; and FIG. 11 shows an exemplary user program for carrying out a recovery even in a case of a power interruption.

DETAILED DESCRIPTION

Figure 1:
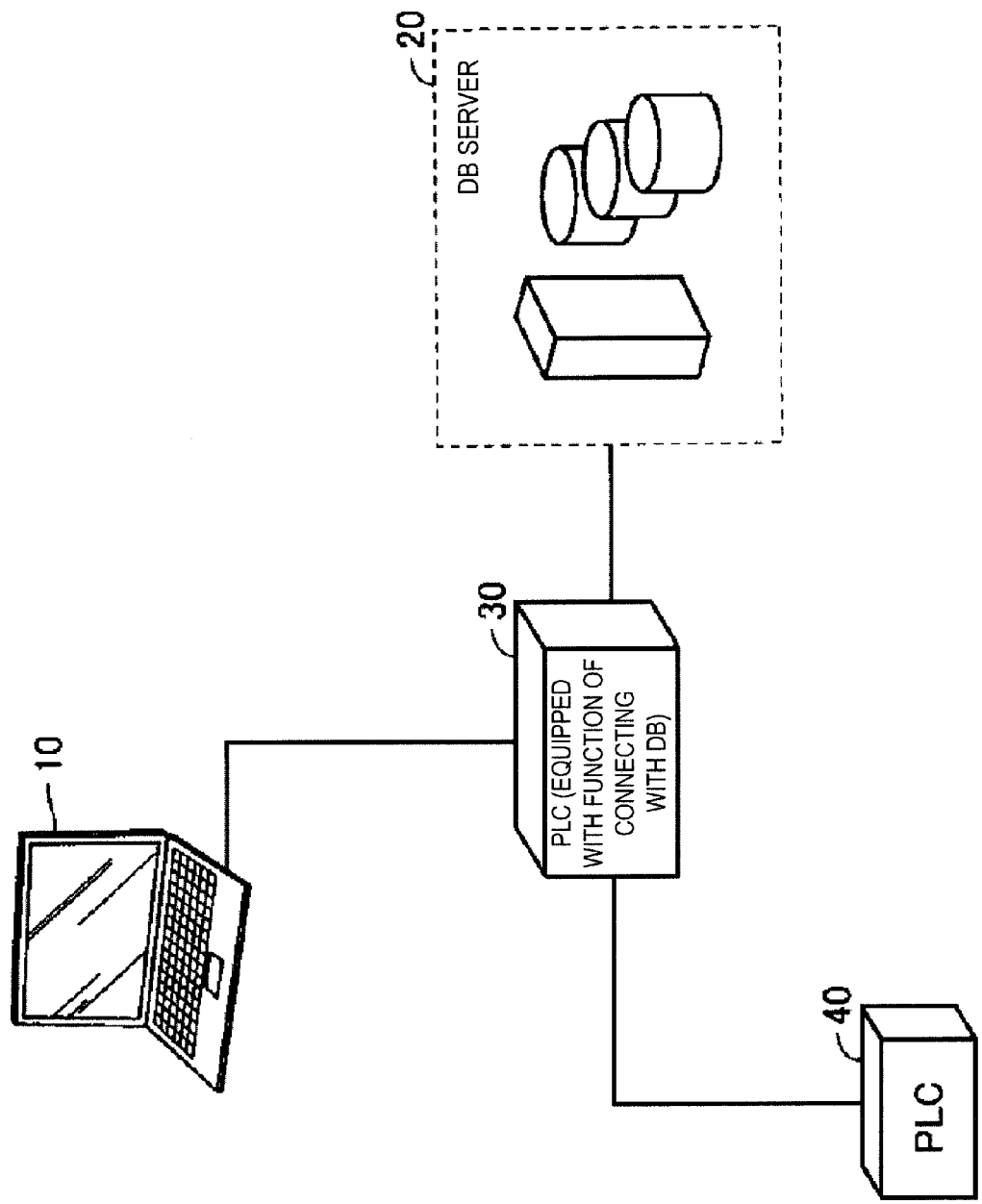
FIG. 1 illustrates an overall configuration of a control system according to an embodiment of the present invention.

Hereinafter, an embodiment of the present invention will be described with reference to the drawings. In the following description, the same reference characters are assigned to the same constitute elements. Constitute elements having the same reference character have the same name and function. Accordingly, a detailed description about the same reference character will not be repeated.

First Embodiment

FIG. 1 illustrates an overall configuration of a control system according to this embodiment.

The outline of the embodiment will first be described. Referring to FIG. 1, a control system includes a personal computer (PC) 10, a database (DB) server 20, and programmable logic controllers (PLCs) 30 and 40. The PC 10 is an information processing device by which a user creates a user program that will operate in the PLC 30. The DB server 20 functions as a database management system (DBMS) that manages a database.

The PLC 30 is connected to the PC 10, the DB server 20, and the PLC 40. The PLC 30 holds setting for connecting with the DB server 20, and accesses the DB server 20 in accordance with this setting.

The PLC 30 receives data from the exterior, such as the output from a sensor, and accumulates the data. Then, the PLC 30 sends to the DB server 20 the accumulated data in accordance with a DB access processing program 35 that will be described below. The PLC 30 receives data that another PLC (the PLC 40 in the example of FIG. 1) has sent to the DB server 20, and sends the received data to the DB server 20. The PLC 40 receives data from the exterior, such as the output from a sensor, and accumulates the data. Then, the PLC 40 sends to the DB server 20 the accumulated data through the PLC 30.

[Detailed Configurations of Individual Instruments]

Detailed configurations of individual instruments will be described.

Figure 2:
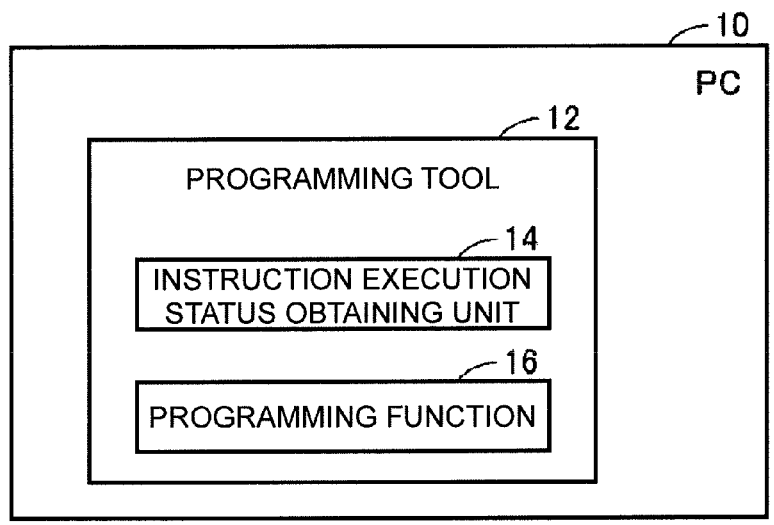
FIG. 2 is a block diagram functionally illustrating a PC.

FIG. 2 is a block diagram functionally illustrating the PC 10.

The PC 10 is a computer system (the information processing device) that includes a micro control unit (MCU), a read only memory (ROM), and a random access memory (RAM). Referring to FIG. 2, the PC 10 functions as a programming tool 12 by which a user creates a user program that will operate the PLC 30. The programming tool 12 functionally includes an instruction execution status obtaining unit 14, and a programming function 16. The PC 10 sends to the PLC 30 a user program that a user has created by the programming tool 12, and then the PLC 30 executes this user program.

The instruction execution status obtaining unit 14 is software that instructs the PLC 30 to send to the PC 10 the content of status information 51 held in a memory of the PLC 30.

The programming function 16 is software that supports a user in creating pieces of program. When the pieces of software are executed in the PC 10, the instruction execution status obtaining unit 14, the programming function 16, and the like fulfill their functions.

Figure 3:
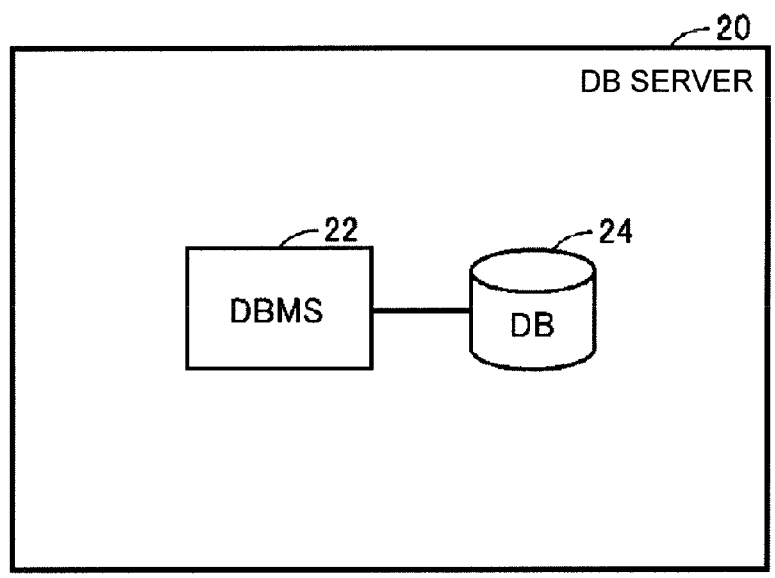
FIG. 3 is a block diagram functionally illustrating a DB server.

FIG. 3 is a block diagram functionally illustrating the DB server 20. The DB server 20 includes a large capacity storage device.

The DB server 20 functions as a database management system (DBMS) 22 that manages read and write operations in a database. The DBMS 22 controls read and write operations in a DB 24 that functions as a database. The DB 24 is a storage region that holds a plurality of data records and, for example, holds data under the control of the DBMS 22.

Figure 4:
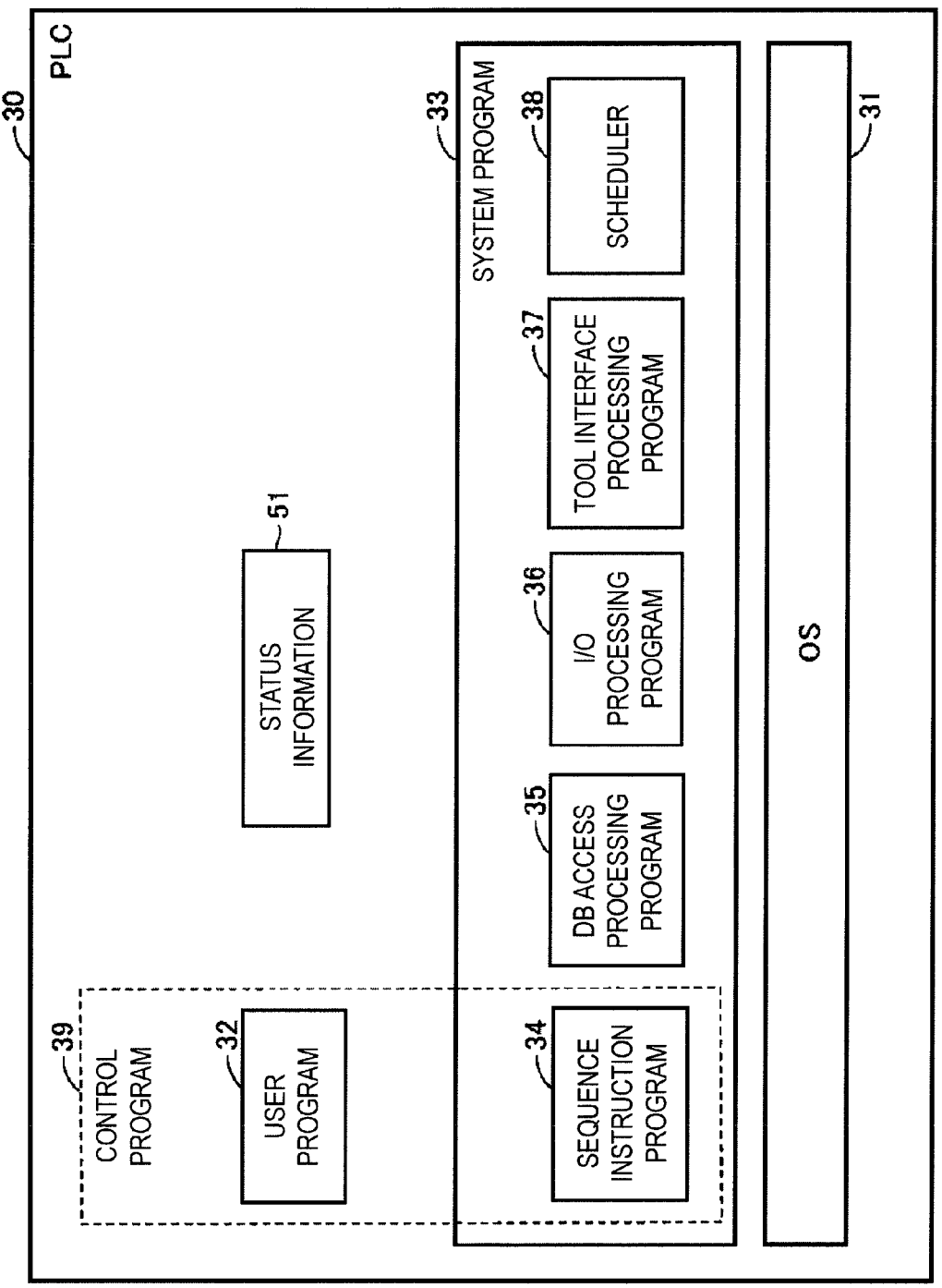
FIG. 4 is a block diagram functionally illustrating a PLC.

FIG. 4 is a block diagram functionally illustrating the PLC 30. The PLC 30 executes a user program periodically. The PLC 30 writes/reads information in or from its memory region, and sequentially executes instructions in the user program. The PLC 30 has I/O functions, receives data from the exterior, such as the output from a sensor, and accumulates the received data. In addition, the PLC 30 sends the accumulated data to the DB server 20.

Referring to FIG. 4, the individual functions of the PLC 30 are performed by the operations of an OS 31, a system program 33, a user program 32, and the like. The PLC 30 holds the status information 51.

The OS 31 manages the resources of the PLC 30, and allows the PLC 30 to function to, for example, schedule tasks and handle accesses to the DB server 20.

The system program 33 is a software group that provides primary functions of the PLC 30. More specifically, the system program 33 contains a sequence instruction program 34, a DB access processing program 35, an I/O processing program 36, a tool interface processing program 37, and a scheduler 38.

The sequence instruction program 34 allows the PLC 30 to function to sequentially execute instructions in the user program 32 while reading/writing information from or in the memory region in the PLC 30.

The DB access processing program 35 is called in response to the execution of the user program 32 by the PLC 30 in accordance with the sequence instruction program 34. In addition, the DB access processing program 35 allows the PLC 30 to function to perform a process in which the user program 32 accesses the DB server 20, such as a process of generating SQL sentences.

The I/O processing program 36 allows the PLC 30 to function to control data input and output to and from the PLC 30 via the plurality of I/O functions included in the PLC 30. The I/O functions are allocated to addresses of the memory. Data held in the memory regions corresponding to the I/O functions are replaced collectively and periodically by external data. The tool interface processing program 37 receives an instruction reported from the PC 10 to the PLC 30 by the function of the programming tool 12 operating in the PC 10. In response to this instruction, the tool interface processing program 37 allows the PLC 30 to function to pass a process to the DB access processing program 35 or the like and to send to the PC 10 the process result or the like. The scheduler 38 allows the PLC 30 to function to schedule tasks that the PLC 30 will perform, on the basis the priorities of the tasks.

The user program 32 is created by the PC 10 and is held in the memory of the PLC 30. Referring to FIG. 4, both the user program 32 and the sequence instruction program 34 constitute a control program 39. The sequence instruction program 34 thus reads the user program 32 from the memory, and executes instructions contained in the user program 32 in order, so that the PLC 30 operates.

The status information 51 is output from the DB access processing program 35, and holds a status in which the DB access processing program 35 accesses the DB server 20. The detail thereof will be described below.

Figure 5A:
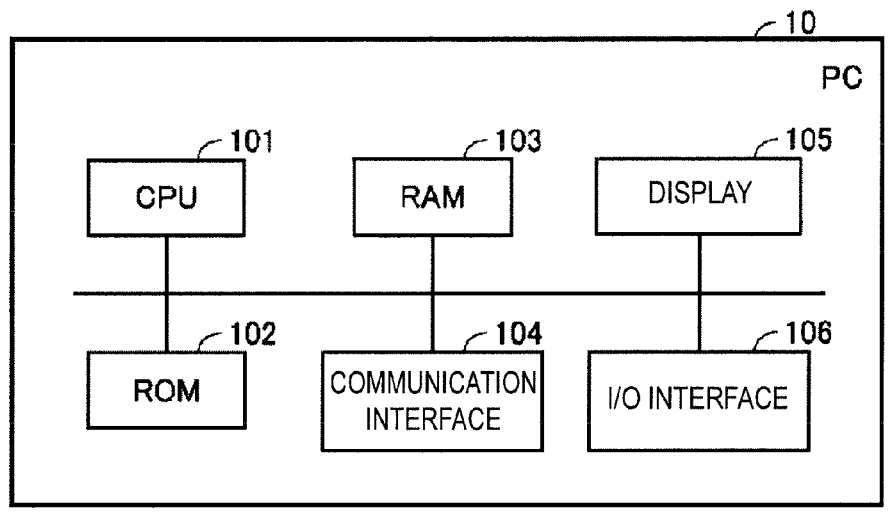
FIGS. 5A and 5B illustrate hardware configurations of the embodiment.

FIG. 5 illustrates the hardware configuration of this embodiment. FIG. 5A illustrates the configuration of the PC 10 as a computer system. Referring to FIG. 5A, the PC 10 includes a CPU 101, a ROM 102, a RAM 103, a communication interface 104, a display 105, and an I/O interface 106. The CPU 101 allows the PC 10 to perform various functions by reading programs from the ROM 102 and the like and executing them. The ROM 102 is a nonvolatile storage region, and stores system data and the like. The RAM 103 is a volatile memory, and stores programs and data. The communication interface 104 enables the PC 10 to communicate with external instruments. The display 105 enables the CPU 101 or the like to visually output its calculation result. The I/O interface 106 enables the PC 10 to receive a user's input operation and the like and to output the operational status of the PC 10.

Figure 5B:
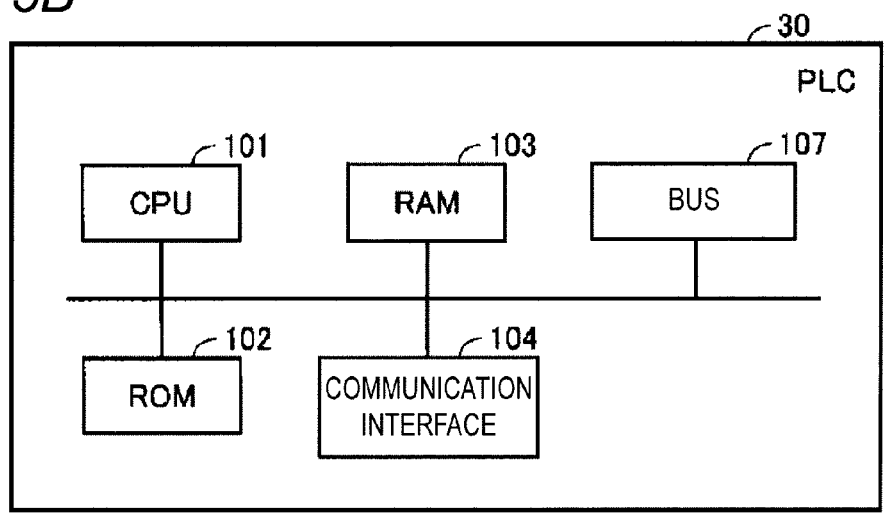

FIG. 5B illustrates the hardware configuration of the PLC 30. The PLC 30 includes a CPU 101, a ROM 102, a RAM 103, a communication interface 104, and a bus 107. The hardware configuration of the PLC 40 is similar to that of the PLC 30.

[Data]

Data used in this embodiment will be described.

FIG. 6 shows the data held in the status information 51. The status information 51 contains an output variable State that is output from the DB access processing program 35, and is held in the nonvolatile memory.

In this embodiment, when the user program 32 designates the output of an output variable State, the PLC 30 outputs the output variable State from the DB access processing program 35, and holds it in the nonvolatile memory. The status information 51 holds one of five statuses which are indicated by the output variable State that is output from the DB access processing program 35. The output variable State has an enumerated type of data, and its enumerators are as illustrated in FIG. 6; exemplary enumerators are as follows.

"_DBC_SEND_INIT" (initial status) indicates an initial status in which the DB access processing program 35 accesses the DB server 20.

"_DBC_SEND_UNSENT" (unsent SQL sentence) indicates a (unsent) status in which the DB access processing program 35 has not yet sent to the DB server 20 a SQL sentence.

"_DBC_SEND_SENDING" (SQL sentence being sending) indicates a status in which the DB access processing program 35 is sending to the DB server 20 a SQL sentence and has not yet completed it.

"_DBC_SEND_SPOOLED" (spooling of SQL sentence) indicates a status in which the DB access processing program 35 spools a SQL sentence to be sent to the DB server 20 and the SQL sentence is held in the nonvolatile memory.

"_DBC_SEND_COMPLETE" (completion of sending of SQL sentence) indicates a status in which the DB access processing program 35 completes sending of a SQL sentence to the DB server 20.

[Operation]

An operation of the PLC 30 in this embodiment will be described in detail with reference to the drawings. The outline of the operation in the embodiment is as follows. The PC 10 creates a user program 32 to be executed in the PLC 30, in accordance with a user's input operation. The PLC 30 receives the user program 32 from the PC 10, and stores the received user program. The PLC 30 calls the DB access processing program 35 in response to the execution of the user program 32 by the sequence instruction program 34. The PLC 30 performs a process in which the user program 32 accesses the DB server 20, such as a process of generating and sending a SQL sentence, by the DB access processing program 35.

Figure 7:
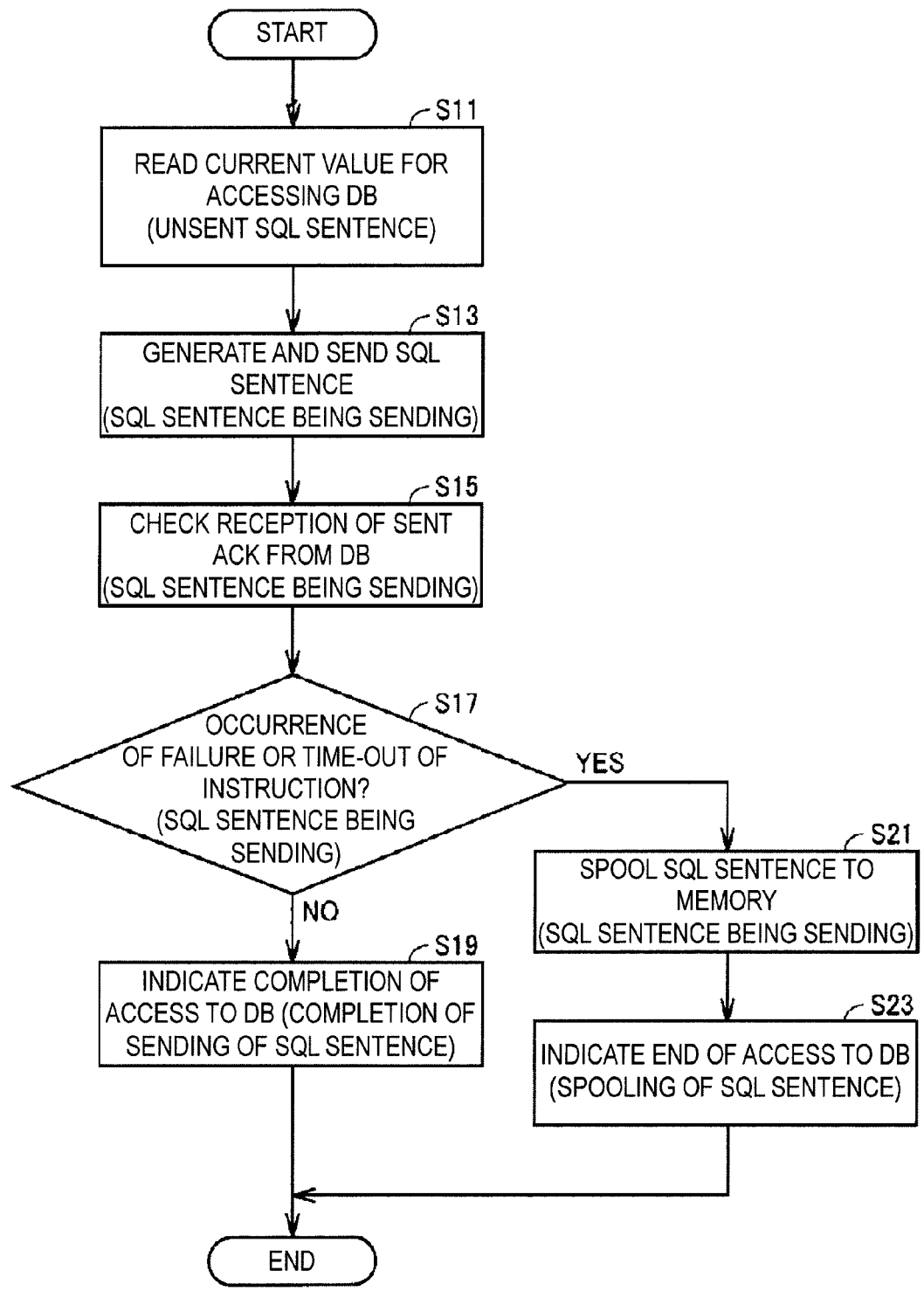
FIG. 7 is a flowchart of a process in which the DB access processing program accesses the DB server and an output variable State indicating a status of an access to the DB server is output.

FIG. 7 is a flowchart of a process in which the DB access processing program 35 accesses the DB server 20 and an output variable State indicating a status of an access to the DB server 20 is output.

In Step S11, the PLC 30 reads a value for accessing the DB server 20 (which is a current value of data to be written to the DB server 20 and accumulated in the memory) by the DB access processing program 35. In this case, the output of the output variable State is "_DBC_SEND_UNSENT" indicating that a SQL sentence has not been sent.

In Step S13, the PLC 30 generates a SQL sentence for accessing the DB server 20 by the DB access processing program 35, and sends the SQL sentence to the DB server 20. In this case, the output of the output variable State becomes "_DBC_SEND_SENDING" indicating that a SQL sentence is being sent.

In Step S15, the PLC 30 waits for an Ack response (sent Ack) from the DB server 20, in response to the SQL sentence sent to the DB server 20 by the access processing program 35, until a time-out occurs. In this case, the output of the output variable State is "_DBC_SEND_SENDING" indicating that a SQL sentence is being sent.

In Step S17, the PLC 30 determines whether or not it has received an error during the communication with the DB server 20 by the DB access processing program 35 and/or whether or not the time-out has occurred during the process of receiving the Ack response. In this case, the output of the output variable State is "_DBC_SEND_SENDING" indicating that a SQL sentence is being sent. If the positive determination is made in Step S17, the PLC 30 performs a process of Step S21 by the DB access processing program 35. Otherwise, if the negative determination is made in Step S17, the PLC 30 performs a process of Step S19 by the DB access processing program 35.

In Step S19 (sending of the SQL sentence to the DB server 20 by the DB access processing program 35 has successfully been completed), the PLC 30 outputs a response to the program that has called the DB access processing program 35, by the DB access processing program 35, this response indicating that the access to the DB server 20 has been completed. In this case, the output of the output variable State becomes "_DBC_SEND_COMPLETE" indicating that sending of a SQL sentence has been completed.

In Step S21, the PLC 30 spools, to the nonvolatile memory, the SQL sentence which has not been successfully sent to the DB server 20 by the DB access processing program 35. Until the completion of the spooling, the output of the output variable State has been "_DBC_SEND_SENDING" indicating that a SQL sentence is being sent.

In Step S23, the PLC 30 outputs a response to the program that has called the DB access processing program 35, by DB access processing program 35, this response indicating that the access to the DB server 20 has been completed. In this case, the output of the output variable State becomes "_DBC_SEND_SPOOLED" indicating that a SQL sentence has been spooled.

Figure 8:
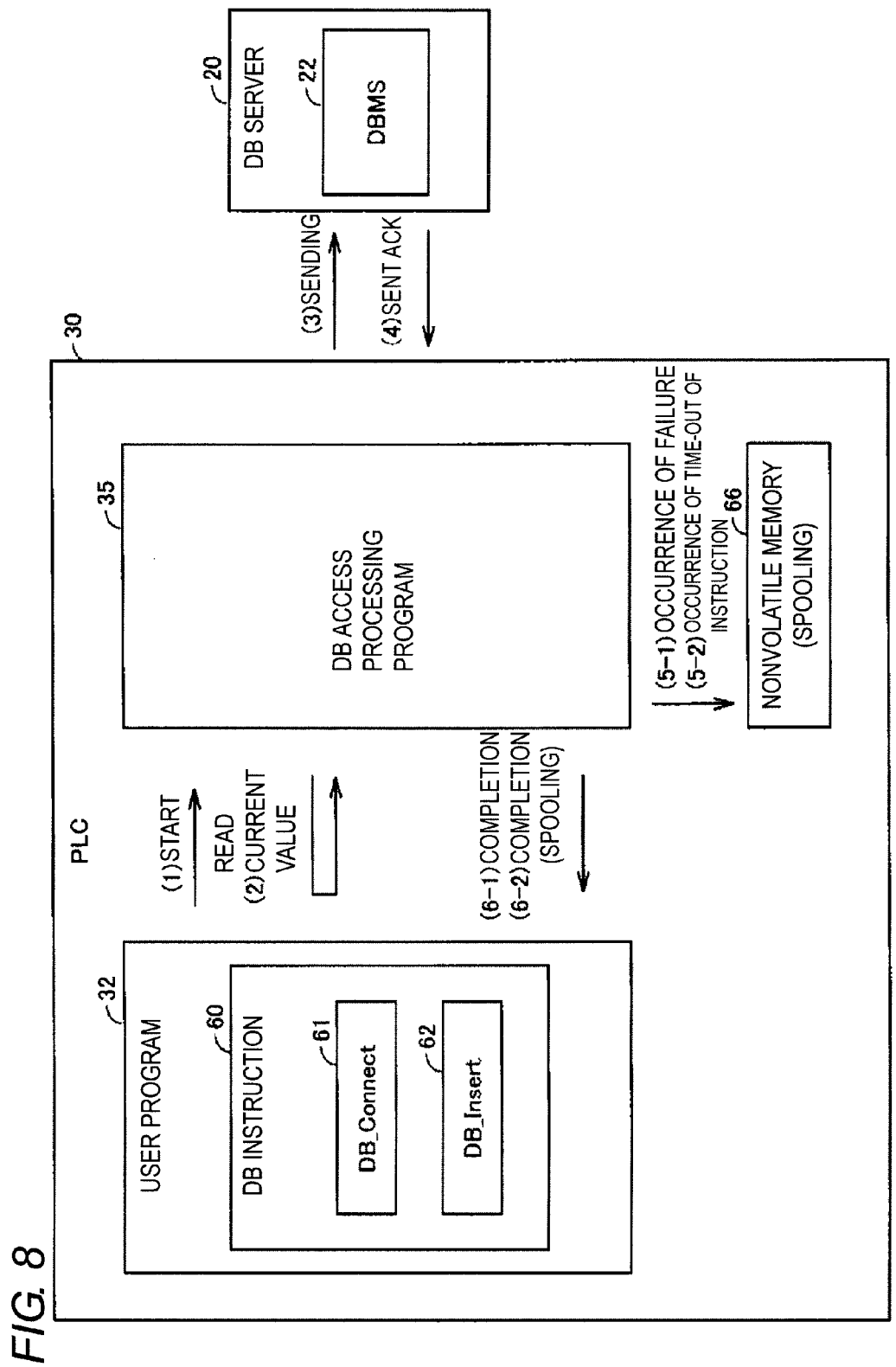
FIG. 8 illustrates a process in which the DB access processing program starts an access to the DB server in accordance with an instruction from a user program, and outputs an output variable State.

FIG. 8 illustrates a process in which the PLC 30 starts an access to the DB server 20 by the DB access processing program 35, in accordance with an instruction from the user program 32, and outputs an output variable State.

(1) Start

A DB instruction 60 contained in the user program 32 calls the DB access processing program 35 in order to access the DB server 20. The DB instruction 60 contains DB_Connect instruction 61 that instructs the connection with the DB server 20, and DB_Insert instruction 62 that inserts data into the DB server 20. In response to the execution of the DB instruction 60 that contains an instruction of outputting an output variable State from the DB access processing program 35, the PLC 30 calls the DB access processing program 35, and starts outputting an output variable State.

(2) Reading of Current Value

The PLC 30 performs the process of Step S11 by the DB access processing program 35.

(3) Sending

The PLC 30 performs the process of Step S13 by the DB access processing program 35.

(4) Sent Ack

The PLC 30 performs the processes of Step S15 and Step S17 by the DB access processing program 35.

(5-1) Occurrence of Failure (5-2) Occurrence of Time-Out of Instruction

The PLC 30 spools a SQL sentence to a nonvolatile memory 66 by performing the process of Step S21 by the DB access processing program 35.

(6-1) Completion (6-2) Completion (of Spooling)

The PLC 30 performs the process of Step S19 or Step S23 by the DB access processing program 35.

FIG. 9 is a table showing the timing of a power interruption, an output variable State, and measures taken against a power interruption.

FIG. 9 shows the timing of the power interruption, (1) Start, (2) Reading of current value, (3) Sending, (4) Sent Ack, (5-1) Occurrence of failure, (5-2) Occurrence of time-out of instruction, (6-1) Completion, and (6-2) Completion (of spooling), which correspond to the that described in FIG. 8. Referring to FIG. 9, when a power interruption occurs at the timing of "(1) Start" or "(2) Reading of current value," a SQL sentence has not yet been sent to the DB server 20 by the DB access processing program 35. Therefore, a measure taken against the power interruption is to re-send a SQL sentence by executing the user program 32 to call the DB access processing program 35 again.

When a power interruption occurs at the timing of "(3) Sending," "(4) Sent Ack," "(5-1) Occurrence of failure," or "(5-2) Occurrence of time-out of instruction," a SQL sentence has been sent to the DB server 20 by the DB access processing program 35. Therefore, a measure taken against the power interruption is to check whether or not a record is present in the DB server 20, and re-send the SQL sentence to the DB server 20 if no records are created therein.

When a power interruption occurs at the timing of "(6-1) Completion," the sending of a SQL sentence to the DB server 20 by the DB access processing program 35 has been completed. Therefore, no special measures are required against the power interruption.

When a power interruption occurs at the timing of "(6-2) Completion (of spooling)," a SQL sentence has been spooled. Therefore, a measure taken against the power interruption is to re-send the spooled SQL sentence by the DB access processing program 35.

[Exemplary User Program]

Up to this point, the operation has been described, in which when the PLC 30 accesses the DB server 20 by the DB access processing program 35, the DB access processing program 35 outputs an access status to the status information 51. Next, a description will be given of an exemplary user program for allowing the DB access processing program 35 to output the status information 51, and another exemplary user program for carrying out a recovery even in a case of a power interruption.

FIG. 10 shows an exemplary user program for allowing the DB access processing program 35 to output the status information 51

Referring to FIG. 10, for example, the user program 32 contains an instruction for calling the DB access processing program 35 (e.g. DB_Insert instruction 62), this instruction containing an instruction for storing a status of accesses to the DB server 20 output from the DB access processing program 35.

FIG. 11 shows an exemplary user program for carrying out a recovery even in a case of a power interruption. In FIG. 11, an exemplary functional block "DB_Insert" is shown in addition to an exemplary user program 32. Referring to FIG. 11, the user program 32 contains an instruction of referring to status information 51 stored in the nonvolatile memory at the first cycle ("P_First_RunMode") after the power to the PLC 30 is turned on. If the status information 51 shows "_DBC_SEND_UNSENT" (unsent SQL sentence) at the first cycle after the turn-on of the power, the PLC 30 re-sends a SQL sentence. Otherwise, if the status information 51 shows "_DBC_SEND_SENDING" (SQL sentence is sending), the PLC 30 checks the presence of records in the DB server 20, and re-sends a SQL sentence, depending on the check result. The recovery program may cause the PLC 30 to perform the process according to the sending status of a SQL sentence.

It will be appreciated that the embodiments described above may be carried out in combination. The present invention contemplated by the present inventor has been concretely described based on the embodiments; however, this invention is not limited to these embodiments, and various modifications thereof can be made without departing from the spirit of the invention.

It is understood that the embodiments disclosed herein are exemplary and explanatory in all respects, and are not restrictive. The foregoing description, therefore, is not to be taken in a limiting sense, and the scope of the invention is defined by the appended claims; the meaning of equivalents to the claims and all possible modifications are intended to fall within the scope of the invention.

What is claimed is:

1. A controller comprising:
a communication interface configured to connect with a database;
a processor; and
a memory including instructions that, when executed by the processor, cause the processor to perform operations including:
generating a structured query language (SQL) instruction sentence in accordance with an access instruction for accessing the database, the access instruction having a plurality of steps, in response to execution of a user program containing the access instruction, and controlling an access to the database on the basis of the generated instruction sentence, wherein the instruction sentence is stored in a nonvolatile memory until a process based on the instruction sentence is completed; and generating and storing status information that indicates an execution status of the access instruction, from a start of the access instruction to a completion of the access instruction, wherein the status information is obtained at an occurrence of an interrupting event affecting the access to the database, wherein the status information comprises one of five designated statuses including an initial status in which the processor accesses the database, an unsent status in which the processor has not yet sent the SQL instruction sentence to the database, a sending status in which the processor is sending the SQL instruction sentence to the database, a spooling status in which the processor spools the SQL instruction sentence and a spooled SQL instruction sentence is stored in the memory, and a complete status in which the processor completes sending of the SQL instruction sentence to the database, wherein when the interrupting event affecting access to the database occurs during the unsent status, the processor re-sends the SQL instruction sentence to the database; when the interrupting event affecting access to the database occurs during the sending status, the processor re-sends the SQL instruction sentence to the database; when the interrupting event affecting access to the database occurs during the spooling status, the processor sends the spooled SQL instruction sentence to the database; and when the interrupting event affecting access to the database occurs during the complete status, the processor takes no action to re-send the SQL instruction sentence.

2. The controller according to claim 1, wherein the interrupting event affecting access to the database occurs during a period in which an acknowledgement response is being received from the database.

3. The controller according to claim 1, wherein
the status information contains information that indicates the sending status of the structured query language (SQL) sentence for accessing the database.

4. The controller according to claim 1, wherein
the status information contains information that indicates whether to save the structured query language (SQL) sentence for accessing the database to a storage.

5. The controller according to claim 1, the operations further comprising storing a recovery program that refers to the status information and that recovers a process of the access to the database, depending on an access status indicated by the status information, the recovery program being executed in a predetermined operating status.

6. The controller according to claim 5,
wherein the recovery program performs the recovery, depending on a sending status of the structured query language (SQL) sentence that the controller sends to the database.

7. The controller according to claim 1, the operations further comprising:
receiving first data from a sensor external to the controller and sending the first data to the database; and
receiving second data from a second controller and sending the second data to the database.

8. The controller according to claim 1,
wherein the interrupting event comprises a power interruption, and
wherein a recovery of the access to the database is based upon a respective one of the five designated statuses.

9. A non-transitory computer readable storage medium that stores a set of executable instructions for controlling an operation of a controller, the executable instructions, when executed by a processor, causing the controller to:
generate a structured query language (SQL) instruction sentence in accordance with an access instruction for accessing a database, the access instruction having a plurality of steps, in response to execution of a user program containing the access instruction, and control the access to the database on the basis of the generated instruction sentence, wherein the instruction sentence is stored in a nonvolatile memory until a process based on the instruction sentence is completed; and
generate and hold status information that indicates an execution status of the access instruction, from a start of the access instruction to a completion of the access instruction, wherein the status information is obtained in response to an occurrence of an interrupting event affecting the access to the database, wherein the status information comprises one of five designated statuses including an initial status in which the processor accesses the database, an unsent status in which the processor has not yet sent the SQL instruction sentence to the database, a sending status in which the processor is sending the SQL instruction sentence to the database, a spooling status in which the processor spools the SQL instruction sentence and a spooled SQL instruction sentence is stored in memory, and a complete status in which the processor completes sending of the SQL instruction sentence to the database, wherein when the interrupting event affecting access to the database occurs during the unsent status, the processor re-sends the SQL instruction sentence to the database; when the interrupting event affecting access to the database occurs during the sending status, the processor re-sends the SQL instruction sentence to the database; when the interrupting event affecting access to the database occurs during the spooling status, the processor sends the spooled SQL instruction sentence to the database; and when the interrupting event affecting access to the database occurs during the complete status, the processor takes no action to re-send the SQL instruction sentence.

10. The non-transitory computer readable storage medium of claim 9,
wherein the interrupting event comprises a power interruption, and
wherein a recovery of the access to the database is based upon a respective one of the five designated statuses.

11. The non-transitory computer readable storage medium of claim 9, the executable instructions, when executed by the processor, further causing the controller to:
determine whether the interrupting event has occurred during a period in which the structured query language (SQL) sentence is being sent to the database or whether the interrupting event has occurred during the receipt of an acknowledgement response from the database.

12. The non-transitory computer readable storage medium of claim 11,
wherein if a determination has been made that the interrupting event has occurred during a period in which the structured query language (SQL) sentence was being sent to the database,
the executable instructions, when executed by the processor, further causing the controller to:

determine whether a record is present in the database, and if no records are present in the database, instruct that the structured query language (SQL) sentence be resent to the database.

\* \* \* \* \*